Patented Mar. 25, 1930

1,751,955

UNITED STATES PATENT OFFICE

FRITZ STOEWENER, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

MANUFACTURE OF ACTIVE SILICA

No Drawing. Application filed July 16, 1926, Serial No. 123,027, and in Germany July 23, 1925.

In the manufacture of active silica, the initial materials, for example alkali metal silicate and an acid, are generally brought to reaction under such conditions as regards the temperature, quantity and concentration as to produce a sol, which sol is allowed to set to a homogeneous jelly, which is purified by washing and slowly dried at a low temperature. Thereby the volume of the jelly shrinks to between about a tenth and twentieth of its original volume. This manner of working requires large plants for purification and drying and a great amount of heat and can be carried out more economically only by employing a sol or jelly rich in silica. The preparation of such highly concentrated sols and jellies is only possible to a certain degree especially when the sol prior to its coagulation is to have acid, neutral or at the utmost, only slightly alkaline reaction which conditions are necessary for the production of highly efficient adsorbents with fine pores.

I have now found that a granular active silica very suitable for the adsorption of gases and vapors can be prepared in a very profitable manner by precipitating silica by decomposition of suitable silicon compounds without intermediately forming a sol or jelly and subjecting the precipitate after being freed from mother liquor to a high pressure of at least 100 atmospheres.

The silica can be precipitated by decomposing silicate solutions by means of acids or solutions of acid or neutral salts or mixtures thereof, whereby under proper conditions mixed precipitates of silica and metal oxids or hydroxids, for example of oxids of aluminium, iron, chromium, nickel and the like, can also be obtained. Instead of silicate solutions other silicon compounds such as silicon fluorid, silicon tetra chlorid and the like may be employed as starting materials and in these cases water, alkalis or alkali metal silicate solutions may be used as decomposing means. Precipitation may also be effected by gases or organic liquids or by the mother liquors resulting from pressing. The silica contained in natural or artificial silicates such as silicate rocks or slags and the like may be utilized by treating the said materials, if necessary after grinding them, with acids and decomposing the resulting solution by means of alkalis, solutions of salts and the like in the manner described above.

The solutions containing the precipitates should preferably have an acid, neutral or, at the utmost, slightly alkaline reaction. The precipitate can be washed with water or acids completely or partially before or after pressing or after a preliminary pressing operation, and it is advantageous to leave the last traces of impurities, for example acids, in the precipitate, as thereby the formation of pores is favorably influenced. A filter press or spindle press may be used for separating from the mother liquor and for the preliminary pressing of the precipitate.

The high pressure is advantageously maintained for some length of time. By the high pressure the precipitate can be shaped into suitable forms simultaneously, if desired. The press cakes are heated for removing the adsorbed water, preferably after being made into grains.

The process according to my invention permits of starting from considerably more concentrated initial solutions, than when preparing sols and jellies, whereby the size of the apparatus can be reduced to one half or one third. Further, the separation of the mother liquor and pressing of the precipitate can be effected directly after the precipitation, while hitherto it was necessary to allow the jellies to stand for a considerable time in order to be readily washable. The purification and drying of the pressed or partially pressed precipitate is much cheaper by reason of the saving in time, room and energy.

According to my present invention, by the pressing operation under high pressure of precipitates which are preferably obtained from non-alkaline or, in the utmost, slightly alkaline mixtures, hard, granular masses of comparatively small volume are obtained which are distinguished by their high adsorbing power for gases and vapors.

It may be advantageous to subject the adsorbents obtained as described above, before or after drying them and if desired after saturation with water vapor, to treatment with acids in order to remove admixtures, such as oxids or hydroxids, partially or completely.

The products can be used as adsorbents or as catalysts, especially for removing sulfur from gases or oils or for refining liquids.

The following examples will further illustrate how my invention may be carried out in practice, but the invention is not limited to these examples. The parts are by volume.

*Example 1*

From 2 parts of sodium silicate solution of 1.185 specific gravity a silica precipitate is produced by mixing with 1 part of concentrated hydrochloric acid while stirring. The precipitate is filtered off and pressed and exposed for 3 hours to a pressure of 550 atmospheres. Thereupon it is well washed with hot water and dried at between 100° and 200° C., if desired with the aid of a vacuum.

*Example 2*

10 parts of sodium silicate solution of 1.38 specific gravity are slowly introduced at room temperature into 4.2 parts of concentrated hydrochloric acid while stirring well. The hard masses precipitated which are suspended in the acid medium, are separated from the mother liquor, preferably by pressing, washed with dilute hydrochloric acid and then with water, whereupon they are exposed to a pressure of 550 atmospheres for 2 hours. The pressed mass is made into grains and dried, beginning with a moderately elevated temperature slowly raised to 400° C.

*Example 3*

1 part of sodium silicate solution of 1.36 to 1.37 specific gravity is caused to run slowly into between 1.6 and 2 parts of sulfuric acid of 10 per cent strength, while stirring. The granular precipitate is separated from the mother liquor and exposed to high pressure. The pressed mass is made into grains, washed with acid and water and dried at between 200° and 400° C.

What I claim is:

1. The process of producing active silica which comprises precipitating silica in a liquid medium without the formation of sols and jellies, separating the precipitate from the mother liquor and subjecting it to a pressure of at least 100 atmospheres.

2. The process of producing active silica which comprises precipitating silica in a liquid medium without the formation of sols and jellies, while taking care that the mother liquor has a non-alkaline reaction, separating the precipitate from the mother liquor and subjecting it to a pressure of at least 100 atmospheres.

3. The process of producing active silica which consists in precipitating silica in a liquid medium without the formation of sols and jellies, separating the precipitate from the mother liquor, washing and subjecting it to a pressure of at least 100 atmospheres and drying it.

4. The process of producing active silica which consists in preparing a precipitate containing silica in a liquid medium without the formation of sols and jellies, separating the precipitate from the mother liquor and subjecting it to a pressure of at least 100 atmospheres, washing and drying it.

In testimony whereof I have hereunto set my hand.

FRITZ STOEWENER.